June 5, 1928.

J. C. TURNER 1,672,399

AUTOMOTOR

Filed May 29, 1925

J. C. Turner,
INVENTOR.

BY Emil F. Lange,
ATTORNEY

Patented June 5, 1928.

UNITED STATES PATENT OFFICE.

JAMES C. TURNER, OF LINCOLN, NEBRASKA.

AUTOMOTOR.

Application filed May 29, 1925. Serial No. 33,652.

My invention relates to automotors, the present embodiment of the invention being in the nature of an improvement of the automotor which is shown, described, and claimed in my prior Patent No. 1,493,654, issued May 13, 1924.

The improvements relate mainly to the simplification of the adjustments and to the alteration of the construction whereby the automotor becomes entirely automatic. In my prior device the rear wheels of the automobile were carried over the drive pulleys by means of a track which had to be reset whenever it was desired to place the automobile in operative position on the automotor. In the present instance the jack is automatically reset when the automobile leaves the automotor, so that it is ready at all times, for instant use. The adjustments also have been greatly simplified and made more precise and accurate.

Referring now to the drawings.

Figure 1:
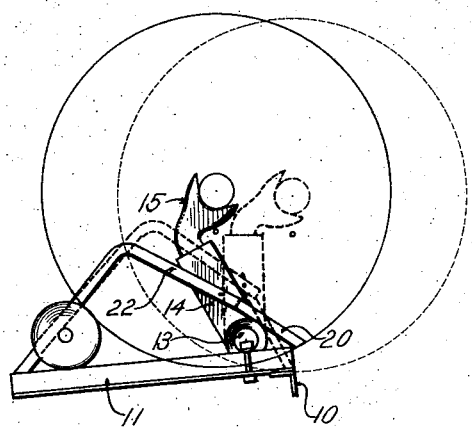
Figure 1 is a side elevational view.

The base of the automotor comprises a transverse beam 10 and rearwardly projecting beams 11, the terms "transverse" and "rearwardly projecting" having reference to the position and direction of the automobile. The beams 10 and 11 are preferably formed from angle iron or steel since this material combines the necessary strength with extreme lightness of weight. The beams 11 are secured to the beam 10 in such a manner that one web of each beam 11 projects upwardly. The base is braced, preferably by means of braces such as those shown at 12.

The jack is entirely automatic in its operation. The rod or pipe 13, which is secured at its extremities to the base, has mounted thereon a pair of lifting levers whereby the automobile is lifted into operative position under its own power. Each lifting lever includes two parts 14 and 15. The parts 14 are preferably castings each having a sleeve portion and a projecting arm. The sleeves are such that the castings are freely slidable and rotatable on the tube 13. The projecting arms are preferably channeled for receiving a part 15, the parts 14 and 15 being adjustably secured together. The parts 15 are provided at their upper ends with means for engaging the housing of the rear axle shaft of the automobile.

Each rearwardly projecting beam 11 has secured thereto a standard 16 having a bearing 17 at its upper end for receiving the drive shaft 18. The bearings 17 have the usual grease cups for properly lubricating the drive shaft. At the extremities of the drive shaft 18 and secured to rotate therewith are two driven pulleys 19.

Each casting 14 has a brace 20 the lower end of which rests on the base of the automotor for holding its lifting lever perpendicular when the lifting lever is in its inoperative position, as shown in dotted line position in Figure 1. When the automobile is back against the automotor, the rear axle housing of the automobile is engaged by the forks at the upper ends of the lifting levers, so that any further rearward movement of the automobile must be accompanied by a corresponding upward movement of the rear axle and wheels. When the lifting levers reach the full line position of Figure 1, the tires will be in contact with and rest on the pulleys 19, at which time the weight of the rear portion of the automobile will rest partly on the pulleys 19 and partly on the lifting levers. The continued rotation of the rear wheels of the automobile rotates the pulleys 19 and the shaft 18. For thus utilizing the power of the automobile, a pulley 21 is secured to the shaft 18, and this pulley may be connected through a belt to a churn, washing machine, feed grinder, or to any other desired machine. When it is desired to remove the automobile from the automotor, the free end of the bent lever 22 is lifted against the under sides of the rear axle housing to impart a forward impulse to the automobile. The forward movement of the automobile carries the lifting levers forwardly until the lifting levers are in their dotted line position of Figure 1, after which the rear axle housing of the automobile will be automatically released from engagement with the forks of the lifting levers. The lifting levers will then be left in position for reengaging the rear axle housing when it is again desired to use the automotor.

Figure 2:
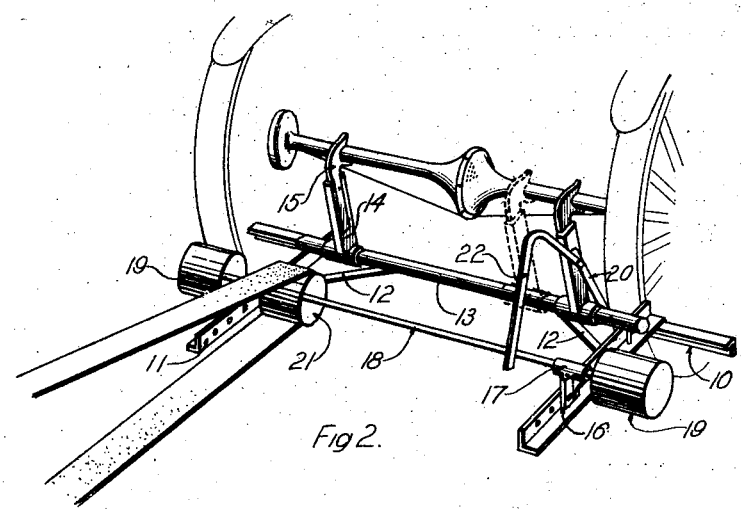
Figure 2 is a view in perspective of my automotor.

The forks of the lifting levers should of course be at or near the level of the rear axle housing, but since there is considerable variation in wheel diameter in the different makes of automobiles, provision must be made for varying the length of the lifting levers accordingly. Slight variations, and in fact considerable variations in wheel diameters will be taken care of by the forks which have such a shape that they will engage the axle housing even when the axle housing is somewhat above or below the seat in the fork. When the variation in wheel diameter is greater than that permitted by the shape of the forks, then the lifting levers must be lengthened or shortened. The part 15 is secured to the part 14 by means of a bolt and when the bolt is removed the two parts have a sliding relation. The two parts may be thus adjusted to give the lever the proper length, after which the bolt is again inserted to lock the parts in their adjusted relation. The lifting levers have also a lateral adjustment as shown in dotted lines in Figure 2. Some automobiles have braces which would interfere with the lifting levers if these levers were in fixed position. The lever collars on the parts 14 are freely slidable on the support 13 so that they can easily be placed in any desired position to clear the braces which may be found on the automobile.

Prior devices of this kind have been largely failures because no provision was made for maintaining the proper pressure between the pulleys and the automobile tires. Whether the pressure is too little or too great, the effect is largely the same. There will be loss of power which may even make unprofitable the use of the automobile for such purposes, and there will be wear on the tires. If the machine is built in such proportions as to furnish the correct pressure for an automobile of one make, the pressure is very apt to be incorrect for an automobile of another make. Even in the same automobile, the pressure decreases as the tires becomes older. In order to meet all of the varying conditions, there must be adjustments for obtaining and maintaining the proper pressure between the tires and the pulleys. In the automotor the weight of the rear portion of the automobile rests partly on the lifting levers and partly on the pulleys 19, the weight being distributed according to the angles of the lifting levers. When the lifting levers are in vertical position they carry practically all of the weight, but as they move backwardly, more and more of the weight is thrust upon the pulleys. The angular position of the lifting levers is, however, governed by the position of the pulleys, so that in order to vary the pressure it is only necessary to alter the position of the pulleys. For this reason the standards 16 are adjustably secured to the beams 11 in such a manner that they can be locked in any desired adjusted position.

In the automotor, all adjustments are of extreme simplicity and after they have once been made they may remain undisturbed indefinitely or until it is desired to use an automobile having larger or smaller wheels. The automotor is light in weight and of such small size that it may be placed in the automobile for transporting it from place to place. The Ford automobile will easily deliver 8 H. P. through the automotor, and this is amply sufficient to operate nearly all of the machines on the farm or about the house. It will regularly do the family washing, and run the separator, churn, or sewing machine. The feed for the live stock may be ground from time to time in small quantities. When there is not sufficient wind to operate the windmill, it will pump the water, and this is particularly important at rush periods such as the threshing season which demands large quantities of water at the very time when the winds are apt to be light and intermittent. When a few hundred bushels of corn are to be shelled, the work can be done at odd times without the necessity of having the large power sheller and a crew of men on the farm. The automotor has numerous and varied uses on the farm, and it possesses peculiar advantages in performing such tasks.

Having thus described my invention in terms which will be readily understood by others skilled in the art to which it pertains, what I claim as new and desire to secure by Letters Patent of the United States is:—

An automotor including a base and a shaft journalled thereon, a pair of pulleys secured to said shaft, a jack secured to said base, said jack consisting of a pair of spaced arms each of which is provided with a forwardly projecting fork at its upper extremity, said arms being secured to said base by a transverse pivot and being slidable on said transverse pivot toward or away from each other, legs adjustably secured to said arms for holding said arms in substantially vertical position when in their inoperative position, means for adjusting the length of said arms, and a belt pulley secured to said shaft, the arrangement being such that when an automobile is backed against said forks the forks will engage the rear axle housing of the automobile and the jack will be moved to position the rear wheels of the automobile in contact with said pair of pulleys.

In witness whereof I affix my signature.

JAMES C. TURNER.